US012791746B2

(12) United States Patent
Lim Chen Ning et al.

(10) Patent No.: US 12,791,746 B2
(45) Date of Patent: Nov. 10, 2026

(54) SYSTEMS AND METHODS FOR CORRECTING DISTRIBUTED ACOUSTIC SENSING DATA

(71) Applicant: CHEVRON U.S.A. INC., San Ramon, CA (US)

(72) Inventors: Ivan Lim Chen Ning, Houston, TX (US); Laura Catherine Swafford, Houston, TX (US); Michael Eric Craven, Katy, TX (US); Kevin John Davies, Royston (GB)

(73) Assignee: CHEVRON U.S.A. INC., San Ramon, CA (US)

( * ) Notice: Subject to any disclaimer, the term of this patent is extended or adjusted under 35 U.S.C. 154(b) by 412 days.

(21) Appl. No.: 18/532,849

(22) Filed: Dec. 7, 2023

(65) Prior Publication Data

US 2024/0192393 A1 Jun. 13, 2024

Related U.S. Application Data

(60) Provisional application No. 63/386,642, filed on Dec. 8, 2022.

(51) Int. Cl.
*G01V 1/36* (2006.01)
*G01V 1/30* (2006.01)
*G01V 1/22* (2006.01)

(52) U.S. Cl.
CPC .............. *G01V 1/362* (2013.01); *G01V 1/307* (2013.01); *G01V 1/226* (2013.01)

(58) Field of Classification Search
CPC . G01V 1/362; G01V 1/36; G01V 1/28; G01V 1/00; G01V 1/307; G01V 1/30; G01V 1/226; G01V 1/22
See application file for complete search history.

(56) References Cited

U.S. PATENT DOCUMENTS

2013/0328688 A1* 12/2013 Price ...................... G08B 21/10 367/129
2022/0187485 A1* 6/2022 Kim ....................... G01V 1/305
2022/0380204 A1* 12/2022 Ahn ..................... G01V 1/3808

OTHER PUBLICATIONS

Zhu et al., "PhaseNet: a deep-neural-network-based seismic arrival-time picking Method" (2018), Department of Geophysics, Stanford University, pp. 261-273. (Year: 2018).*
Cheng et al., "Utilizing distributed acoustic sensing and ocean bottom fiber optic cables for submarine structural characterization" (2021), Scientific Reports, pp. 1-14. (Year: 2021).*
(Continued)

*Primary Examiner* — Mohamed Charioui
(74) *Attorney, Agent, or Firm* — Sheppard, Mullin, Richter & Hampton LLP

(57) ABSTRACT

Systems and methods are provided for correcting distributed acoustic sensing (DAS) data. The system can receive a seismic dataset with a plurality of initial seismic phase picks and a plurality of traces, and cross-correlate each of the plurality of initial seismic phase picks using the plurality of traces as reference traces. Each initial seismic phase pick can receive a set of corrected phase picks. The system can calculate a probability density function for each set of corrected phase picks. The system can select a peak of each probability density functions as accurate seismic phase picks. These accurate seismic phase picks can be used for event location in the DAS data.

20 Claims, 7 Drawing Sheets

(56) References Cited

OTHER PUBLICATIONS

Hauksson et al., "Southern California Hypocenter Relocation with Waveform Cross Correlation, Part 1: Results Using the Double-Difference Method" (2005), Bulletin of the Seismological Society of America, vol. 95, No. 3, pp. 896-903. (Year: 2005).*
Helbig, "Fifty years of amplitude control" (1997), GEOPHYSICS, vol. 63, No. 2 (Mar.-Apr. 1998); p. 750-762. (Year: 1997).*
Shi et al., "A Layer-Stripping Method for 3D Near-Surface Velocity Model Building Using Seismic First-Arrival Times" (2015), Journal of Earth Science, vol. 26, No. 4, p. 502-507. (Year: 2015).*
Ronen et al., "Surface-consistent residual statics estimation by stack-power maximization," Geophysics, vol. 50, No. 12 (Dec. 1985), p. 2759-2767.
Schaff et al., "Optimizing Correlation Techniques for Improved Earthquake Location," Bulletin of Seismological Society of America, vol. 94, No. 2 (Apr. 2004), p. 705-721.
Shearer et al., "Improving local earthquake locations using the L1 norm and waveform cross correlation: Application to the Whittier Narrows, California, aftershock sequence," Journal of Geophysical Research, vol. 102, No. B4, (Apr. 10, 1997), p. 8269-8283.

* cited by examiner

SYSTEMS AND METHODS FOR CORRECTING DISTRIBUTED ACOUSTIC SENSING DATA

CROSS-REFERENCE TO RELATED APPLICATIONS

This application claims the benefit of U.S. Provisional Application No. 63/386,642, filed Dec. 8, 2022, and which is hereby incorporated herein by reference in its entirety.

TECHNICAL FIELD

The present disclosure relates generally to techniques for performing seismic phase pick correction, and in particular, some implementations may relate to seismic phase pick correction as applied to distributed acoustic sensing (DAS) data.

DESCRIPTION OF RELATED ART

Seismic exploration involves surveying subterranean geological media for hydrocarbon deposits. The exploration may be performed as an active survey that typically involves deploying seismic sources and seismic sensors at predetermined locations or a passive survey which only deploys seismic sensors. The seismic sources generate seismic waves, which propagate into the geological medium creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In some embodiments, the seismic sensor may be a fiber optic cable configured to sense changes in strain along the cable which is called distributed acoustic sensing (DAS). In DAS data, seismic sensors comprise fiber optic cables configured to sense changes in strain along the cable. In response to the detected seismic waves, the sensors generate corresponding electrical signals, known as traces, and record them in storage media as seismic data. Seismic data is processed to create seismic images that can be interpreted to identify subsurface geologic features including hydrocarbon deposits and/or to identify locations of microseismic events.

BRIEF SUMMARY OF THE DISCLOSURE

According to various embodiments of the disclosed technology, a computer-implemented method of seismic phase picking can comprise receiving a seismic dataset with a plurality of initial seismic phase picks and a plurality of traces. The initial seismic phase picks can be selected using a phase picking algorithm, which can be overlaid onto the plurality of traces. The computer-implemented method can also cross-correlate each of the plurality of initial seismic phase picks using the plurality of traces as reference traces. Each initial seismic phase pick can receive a set of corrected phase picks. The computer-implemented method can calculate a probability density function for each set of corrected phase picks. Each probability density function can indicate the frequency of a corrected phase pick based on the multiple cross correlations such that the peak can indicate a higher likelihood of an accurate correction to the initial phase pick. The computer-implemented method can select a peak of each probability density functions as accurate seismic phase picks.

In some embodiments, the seismic dataset comprises distributed acoustic sensing (DAS) data.

In some embodiments, the method further comprises linearly interpolating the plurality of initial seismic phase picks. The plurality of initial seismic phase picks can be linearly interpolated to fill in gaps resulting from the initial phase picking stage.

In some embodiments, the plurality of initial seismic phase picks is generated using a machine learning algorithm. Any phase picking algorithm can be applied that can generate P and S picks from DAS data.

In some embodiments, user input determines how many peaks are selected. In some embodiments, one, two or three peaks of the probability density functions can be selected as the accurate phase picks.

In some embodiments, the method further comprises applying amplitude gain control (AGC) to the seismic dataset. AGC can be used in data processing to improve the visibility of seismic data in which attenuation or spherical divergence has caused amplitude decay.

In some embodiments, the method further comprises identifying a seismic event location based on the accurate seismic phase picks. In some embodiments, the location of the event can be determined through an inversion process using a user-defined earth model to compute theoretical travel times of seismic phases.

In some embodiments, the method further comprises generating a linear fit based on the accurate seismic phase picks. The accurate seismic phase picks can form a linear trend when displayed with DAS data. As the accuracy of the seismic phase picks increases, the higher the accuracy of the linear fit.

According to various embodiments of the disclosed technology, a computer system can comprise a processor and a memory encoded with instructions. These instructions can cause the processor to receive a seismic dataset with a plurality of initial seismic phase picks and a plurality of traces. The initial seismic phase picks can be selected using a phase picking algorithm, which can be overlaid onto the plurality of traces. The instructions can also include linearly interpolating the plurality of initial seismic phase picks to account for the plurality of traces. Linear interpolation can resolve any gaps resulting from the initial phase picking process. The instructions can also include cross-correlating each of the plurality of initial seismic phase picks using the plurality of traces as reference traces. Each initial seismic phase pick can receive a set of corrected phase picks. The instructions can also include calculating a probability density function for each set of corrected phase picks. Each probability density function can indicate the frequency of a corrected phase pick based on the multiple cross correlations such that the peak can indicate a higher likelihood of an accurate correction to the initial phase pick. The instructions can also include selecting a peak of each probability density functions as accurate seismic phase picks.

In some embodiments, the seismic dataset comprises distributed acoustic sensing (DAS) data.

In some embodiments, the plurality of initial seismic phase picks is generated using a machine learning algorithm. Any phase picking algorithm can be applied that can generate P and S picks from DAS data.

In some embodiments, user input determines how many peaks are selected. In some embodiments, one, two or three peaks of the probability density functions can be selected as the accurate phase picks.

In some embodiments, the processor is further configured to apply amplitude gain control (AGC) to the seismic dataset. AGC can be used in data processing to improve the visibility of seismic data in which attenuation or spherical divergence has caused amplitude decay.

In some embodiments, the processor is further configured to identify a seismic event location based on the accurate seismic phase picks. In some embodiments, the location of the event can be determined through an inversion process using a user-defined earth model to compute theoretical travel times of seismic phases.

In some embodiments, the processor is further configured to generate a linear fit based on the accurate seismic phase picks. The accurate seismic phase picks can form a linear trend when displayed with DAS data. As the accuracy of the seismic phase picks increases, the higher the accuracy of the linear fit.

According to various embodiments of the disclosed technology, a non-transitory machine-readable storage medium can be encoded with instructions. These instructions, when executed by a processor, can cause the processor to receive a seismic dataset with a plurality of initial seismic phase picks and a plurality of traces. The initial seismic phase picks can be selected using a phase picking algorithm, which can be overlaid onto the plurality of traces. The instructions can also include applying amplitude gain control (AGC) to the seismic dataset. AGC can be used in data processing to improve the visibility of seismic data in which attenuation or spherical divergence has caused amplitude decay. The instructions can also include cross-correlating each of the plurality of initial seismic phase picks using the plurality of traces as reference traces. Each initial seismic phase pick can receive a set of corrected phase picks. The instructions can also include calculating a probability density function for each set of corrected phase picks. Each probability density function can indicate the frequency of a corrected phase pick based on the multiple cross correlations such that the peak can indicate a higher likelihood of an accurate correction to the initial phase pick. The instructions can also include selecting a peak of each probability density functions as accurate seismic phase picks.

In some embodiments, the processor is further configured to linearly interpolate the plurality of initial seismic phase picks. The plurality of initial seismic phase picks can be linearly interpolated to fill in gaps resulting from the initial phase picking stage.

In some embodiments, user input determines how many peaks are selected. In some embodiments, one, two or three peaks of the probability density functions can be selected as the accurate phase picks.

In some embodiments, the processor is further configured to identify a seismic event location based on the accurate seismic phase picks. In some embodiments, the location of the event can be determined through an inversion process using a user-defined earth model to compute theoretical travel times of seismic phases.

In some embodiments, the processor is further configured to generate a linear fit based on the accurate seismic phase picks. The accurate seismic phase picks can form a linear trend when displayed with DAS data. As the accuracy of the seismic phase picks increases, the higher the accuracy of the linear fit.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
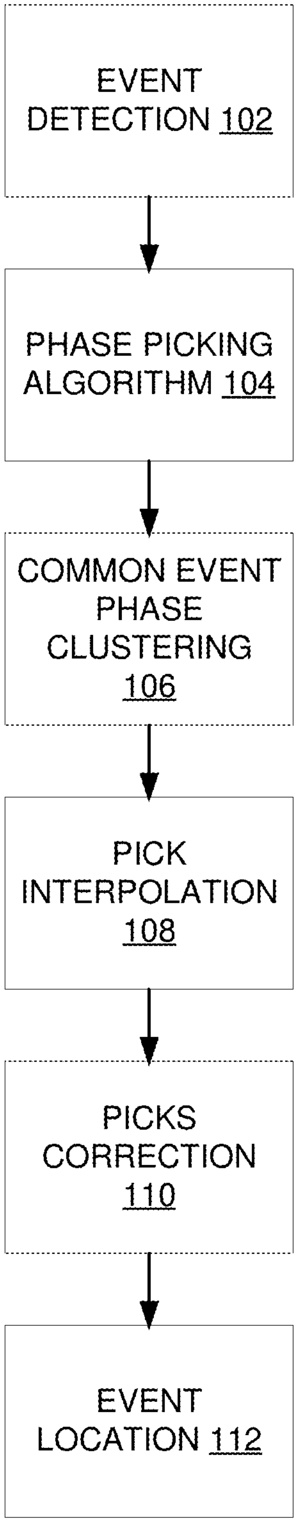
FIG. 1 is an example architecture in accordance with the embodiments described herein.

The figures are not exhaustive and do not limit the present disclosure to the precise form disclosed.

DETAILED DESCRIPTION

In the case of DAS data, events may not be accurately picked which may negatively impact identifying locations of microseismic events. The ability to define the location of rock and fluid property changes in the subsurface is crucial to making the most appropriate choices for purchasing materials, operating safely, and successfully completing projects. Project cost is dependent upon accurate prediction of the position of physical boundaries within the Earth. Decisions include, but are not limited to, budgetary planning, obtaining mineral and lease rights, signing well commitments, permitting rig locations, designing well paths and drilling strategy, preventing subsurface integrity issues by planning proper casing and cementation strategies, and selecting and purchasing appropriate completion and production equipment.

Additionally, traditional systems for continuous passive seismic monitoring from DAS data require a significant amount of time and effort due to the sheer size of data involved. The data needs to be appropriately processed and sorted to be legible for analysis. In particular, "picks" in manipulated DAS data need to be selected to identify the seismic phase. Machine learning models can automatically select picks to some degree of accuracy; however, the results have to be corrected individually by hand. Additionally, traditional machine learning models can fail to select all needed picks. Correcting picks and selecting missing picks is very time consuming and tedious, leading to delayed analyses in an already months long process.

Embodiments of the systems and methods disclosed herein can automate the correction of selected phase picks using cross correlation. In particular, all traces in a channel are used as reference picks to generate a set of corrected phase picks as a probability density function. Additionally, the phase picks are linearly interpolated to fill in areas that are missing phase picks. The probability density function peaks at the point where the most accurate phase pick should be. These peaks can form the corrected phase picks. The DAS data as it is processed can be displayed to a user, including displays of the probability density functions and the final corrected picks. The systems and methods described herein automate the correction process to eliminate the manual correction of each pick. Additionally, conventional practice for seismic phase pick correction is to perform cross-correlation from a reference trace against the traces for which the picks are being corrected. However, this requires additional information or human intervention to evaluate and select the best reference trace. The present method eliminates the need for reference trace selection, establishing a novel statistical and data-driven approach that improves the accuracy of corrected picks.

By using all available traces as reference traces, cross correlation results in a volume of cross-correlation time lags which can be used to correct the original picks. In particular, the cross-correlation time lags can be aggregated to create a probability density function for each initial pick. One or more peaks of each pick can be selected as the best corrections contributed by all of the cross-correlation processes. Adopting a probability density function eliminates the need to choose a reference trace to achieve a proper data-driven method to correct seismic phase pick. This method can extend to areas outside seismic phase picking requiring cross-correlation-based corrections.

FIG. 1 illustrates an example architecture for correcting DAS data in accordance with one embodiment. At block 102, the system can conduct event detection with continuous DAS recording. In some embodiments, event detection can comprise image-based event detection algorithms such as two-dimensional convolutional neural networks or "short-time-average through long-time-average trigger" (STA/LTA) algorithms. In some embodiments, event detection can be accomplished by decimating the seismic traces and applying a seismic phase picker to the decimated subset of data. Here, a seismic trace refers to refers to the recorded curve from a seismograph when measuring ground movement. To process these seismic traces, conventional computer vision methods can be used to highlight seismic events. Some traditional embodiments may use template matching, where a template waveform of an earthquake signal can be used to determine additional events. Note, template matching is not necessary here because the present system does not require prior identification of an event to detect additional events.

At block 104, a phase picking algorithm can be used to pick the initial seismic phases from the DAS data. These initial seismic phases can be referred to as initial "picks". The phase picking algorithm can be applied for individual P and S picks for the respective seismic stations. Here, P and S picks refer to the P and S waves generated from the seismic waves. P waves can travel through liquids, solids, and gases, while S waves can only travel through solids. The formation of these waves characterizes DAS data to determine the structure of the subsurface area. In some embodiments, only P picks or only S picks can be selected depending on what subsurface features are of interest. In some embodiments, PhaseNet can be applied as the phase picking algorithm. In the case of PhaseNet, the input to the algorithm can comprise a three-component seismometer created by duplicating the DAS single-component three times. PhaseNet can be applied to all DAS channels independently to generate P and S picks of interest, together with their respective probabilities. Alternatively, a phase picking algorithm such as short-time average/long-time average (STA/LTA) can be used. This algorithm can use a ratio between the instantaneous amplitude of data for a "short" and "long" user defined window. A pick can be identified when the ratio exceeds a user determined value. Alternative statistical-based methods such as skewness and kurtosis, maximum-likelihood method can also used. Any other phase picking algorithm can be applied, as the correction process does not rely solely on the initial picks in generating the accurate, corrected picks. The phase picking algorithms can generate a list of P and/or S picks.

At block 106, the system can conduct common event phase clustering and association. Event phase clustering can be conducted to determine the number of events associated with the list of P and S picks from all channels. In some embodiments, it may be beneficial to cluster events based on P and/or S waves individually. In other embodiments, the P and S picks can be clustered together. Common event phase clustering can be criteria based, such as based on the minimum number of picks. In some embodiments, unsupervised clustering can be applied to group P and S picks independently. Subsequent unsupervised clustering can be applied to the independent picks to perform P and S phase event association. In other embodiments, events can be grouped manually using visual depictions of the DAS data. By plotting the P and S wave arrivals against the station number, columns of clustered picks can indicate separate events.

Figure 3A:
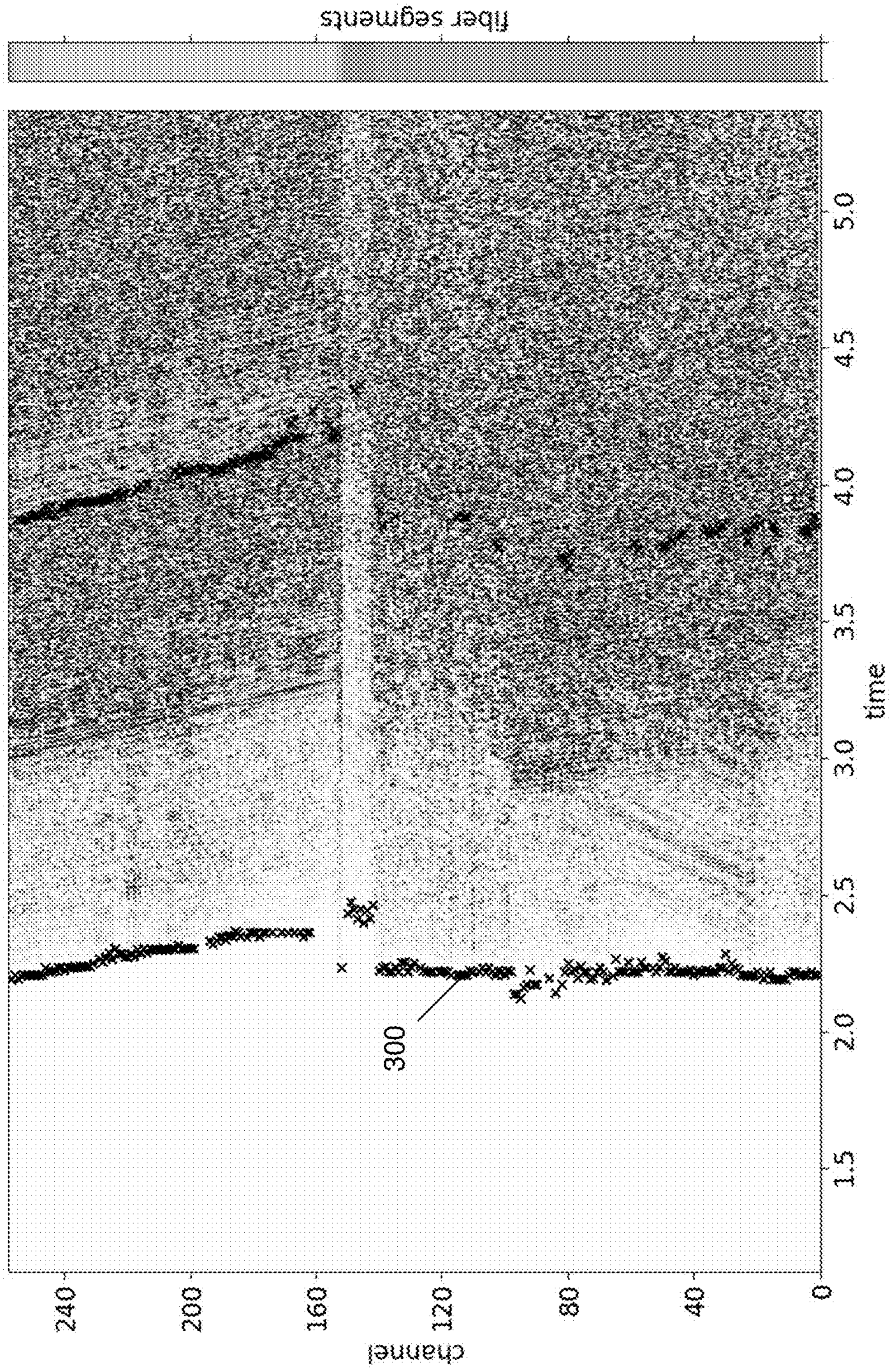
FIG. 3A illustrates an example display of a DAS data plot with initial phase picks, in accordance with one embodiment.
Figure 3B:
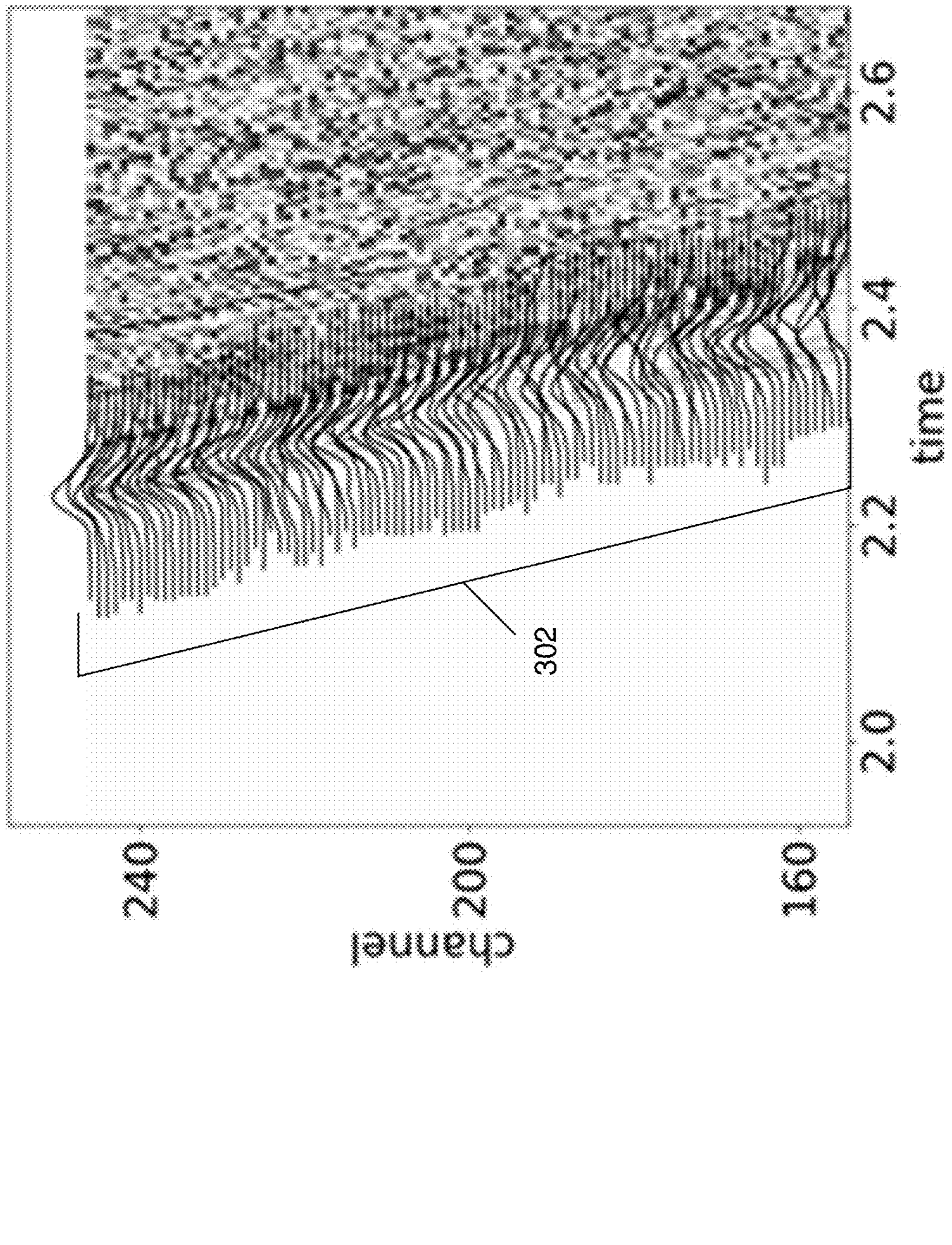
FIG. 3B illustrates an example display of a DAS data plot with probability density functions applied, in accordance with one embodiment.
Figure 3C:
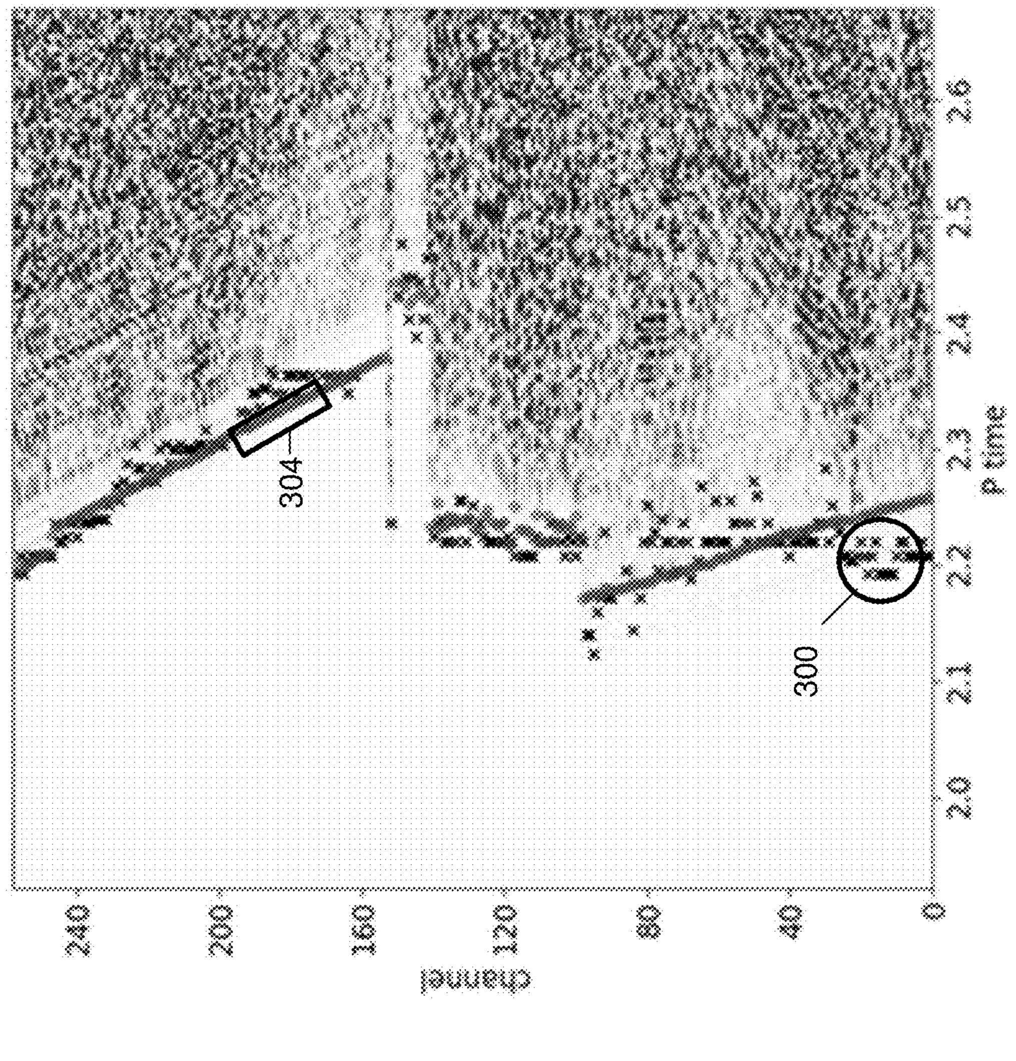
FIG. 3C illustrates an example display of a DAS data plot with corrected phase picks, in accordance with one embodiment.

At block 108, the picks can be linearly interpolated to fill in holes missed by the phase picking algorithm. Linear interpolation can be replaced with other advanced algorithms; however, the correction process does not require accuracy in the initial picks, so linear interpolation is sufficient at this stage. As illustrated in FIGS. 3A-3C, the DAS data can be displayed and/or plotted to indicate the individual channels. After linear interpolation, the initial picks when plotted can generally resemble a linear trend but are overall inaccurate. If the initial picks were entirely accurate, they would plot as a straight line without any undulations. As mentioned above, traditional systems had to correct these initial picks by hand to get a closer linear trend. Corrections are traditionally accomplished by cross correlating the initial pick with a reference trace to generate a corrected pick. These reference traces may be selected at random since there is no way to be sure a reference trace will generate an accurate "corrected" pick. The system of FIG. 1 not only automates this process, but also improves the traditional process by eliminating the need for human selection.

At block 110, the picks can be corrected using cross correlation. As opposed to using one selected reference trace, all the traces in the segment are used to perform the cross-correlation. The system will generate a corrected pick for every reference trace to create a set of new corrected picks for each initial pick. In some embodiment, amplitude gain control (AGC) can be applied to the DAS data prior to cross correlation. Here, AGC refers to automatically controlling the increase in the amplitude of an electrical signal from the original input to the amplified output. AGC is used in data processing to improve the visibility of seismic data in which attenuation or spherical divergence has caused amplitude decay.

Cross correlation can be repeated over all channels to build a series of points. This series of points can be used to build probability density functions. Ideally, if all the reference traces agree on a corrected pick, the resulting probability density function would resemble a spike; however, realistically, the resulting probability density function will comprise one or more peaks with a higher likelihood of being an accurate corrected pick. One or more of these peaks can be selected from each probability density function as a corrected pick. In some embodiments, up to three peaks from each probability density function are selected as corrected picks. The resulting list can comprise a set of corrected picks. In some embodiments, a linear fit can be generated from the set of corrected picks.

This process can be performed iteratively using the corrected picks as the new "initial" picks. As cross correlation is run across all channels, the probability density functions can collapse into a spike indicating a higher likelihood of confidence in the corrected pick. This process can be iteratively run as many times as necessary. In some embodiments, a user of the system interface can select the number of iterations. In other embodiments, the number of iterations may be predefined or default. No retraining is required for this approach because the probability density functions will consistently trend towards a confident spike as the cross correlation is iteratively run.

At block 112, the system can determine event locations based on the final corrected picks. The location of the event can be determined through an inversion process using a user-defined earth model to compute theoretical travel times of seismic phases. The system can minimize the difference between theoretical and observed (picked) seismic phases to isolate the event location. The more accurate the earth model is, the more accurate the yielded seismic phase arrival time.

Figure 2:
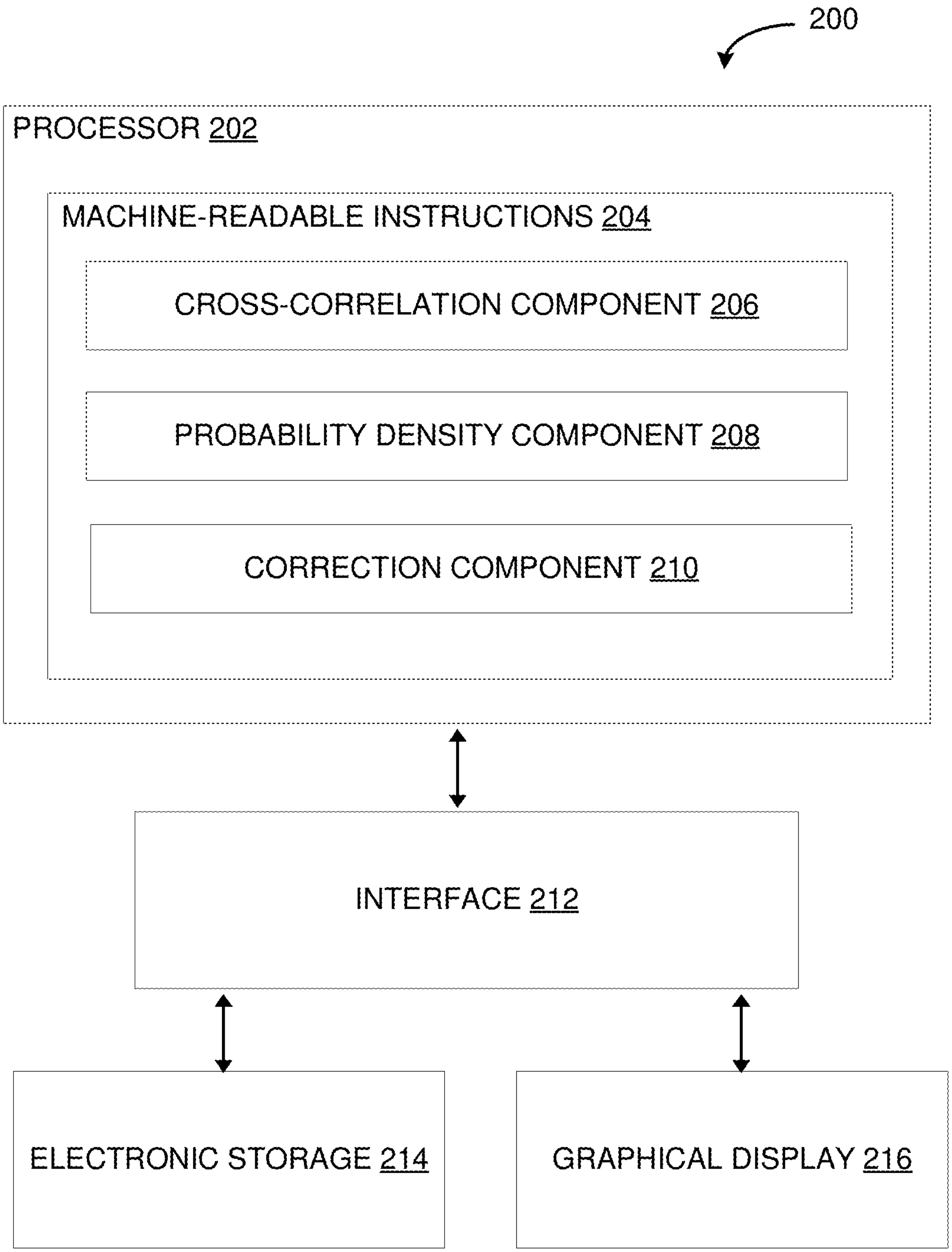
FIG. 2 illustrates an example system incorporating the architecture of FIG. 1.

FIG. 2 illustrates an example system 200 incorporating the architecture as described above in FIG. 1. The electronic storage 214 may be configured to include an electronic storage medium that electronically stores information. The electronic storage 214 may store software algorithms, information determined by the processor 202, information received remotely, and/or other information that enables the system 200 to function properly. For example, electronic storage 214 may store information relating to seismic data, and/or other information. The electronic storage media of electronic storage 214 may be provided integrally (i.e., substantially non-removable) with one or more components of the system 200 and/or as removable storage that is connectable to one or more components of the system 200 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 214 may be a separate component within system 200, or electronic storage 214 may be provided integrally with one or more other components of system 200 (e.g., processor 202). Although electronic storage 214 is shown in FIG. 2 as a single entity, this is for illustrative purposes only. In some implementations, electronic storage 214 may comprise a plurality of storage units. These storage units may be physically located within the same device, or electronic storage 214 may represent storage functionality of a plurality of devices operating in coordination.

Graphical display 216 may refer to an electronic device that provides visual presentation of information. Graphical display 216 may include a color display and/or a non-color display. Graphical display 216 may be configured to visually present information. Graphical display 216 may present information using/within one or more graphical user interfaces. For example, graphical display 216 may present information relating to seismic data, seismic picks, and/or other information.

Processor 202 may be configured to provide information processing capabilities in the system 200. As such, processor 202 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 202 may be configured to execute one or more machine-readable instructions 204 to facilitate seismic event picking. Machine-readable instructions 204 may include one or more computer program components. Machine-readable instructions 204 may include a cross-correlation component 206, a probability density function component 208, a correction component 210, and/or other computer program components.

It should be appreciated that although computer program components are illustrated in FIG. 2 as being co-located within a single processing unit, one or more of computer program components may be located remotely from the other computer program components. While computer program components are described as performing or being configured to perform operations, computer program components may comprise instructions which may program processor 202 and/or system 200 to perform the operation.

While computer program components are described herein as being implemented via processor 202 through machine-readable instructions 204, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

Referring again to machine-readable instructions 204, the cross-correlation component 206 may be configured to cross-correlate each trace in the seismic dataset against every trace in the seismic dataset. As described above, system 200 can generate a corrected pick for every reference trace to create a set of new corrected picks for each initial pick. This cross correlation can be repeated over all channels to build a series of points. Probability density function component 208 may be configured to calculate probability density functions. As described above, the series of points can be used to build probability density functions for each initial pick. The resulting probability density function will comprise one or more peaks with a higher likelihood of being an accurate corrected pick. Correction component 210 may be configured to use the probability density function peaks to identify the best corrections for the seismic picks. As described above, one or more of these peaks can be selected from each probability density function as a corrected pick. In some embodiments, up to three peaks from each probability density function are selected as corrected picks. The resulting list can comprise a set of corrected picks. Components 206-210 can run iteratively using the corrected picks as the new "initial" picks. This process can be iteratively run as many times as necessary. In some embodiments, a user of the system interface can select the number of iterations. In other embodiments, the number of iterations may be predefined or default.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 202 may be configured to execute one or more additional computer program components that may perform some or all of the functionality attributed to one or more of computer program components described herein.

FIG. 3A illustrates an example display of the DAS data as the system executes a phase picker. This display can plot the DAS data based on the time and relevant channel across all fiber segments. Initial picks 300 are illustrated using black X marks at the edge of the traces. As described above, a phase picking algorithm can generate initial picks 300 based on P and S picks for the respective seismic stations. In some embodiments, the phase picker algorithm can be applied to all DAS channels independently to generate P and S picks of interest, together with their respective probabilities. In the example of FIG. 3A, probabilities can be indicated by coloring the traces or other visual marker. The phase picking algorithms can generate a list of P and/or S picks; however, these initial picks can be overlaid onto the DAS data as illustrated by the display in FIG. 3A.

FIG. 3B illustrates an example display of the DAS data after cross correlation is run using all traces as reference traces. The display in FIG. 3B illustrates probability density functions 302 that can be generated after cross correlation. As described above, cross correlation can be repeated over all channels to build a series of points. This series of points can be used to build probability density functions. In the display of FIG. 3B, probability density functions 302 are overlaid onto the DAS data. The point(s) where the probability density functions peak indicate the location of the desired corrected pick. The resulting probability density functions can comprise one or more peaks with a higher likelihood of being an accurate corrected pick. One or more of these peaks can be selected from each probability density function as a corrected pick. In some embodiments, the user interface can allow a user to select the desired number of peaks from each probability density function. Alternatively, the system may set a predefined number of peaks to be selected. If a probability density function has multiple peaks, the highest peaks can be selected if a limited number of peaks is selected.

FIG. 3C illustrates an example display of the DAS data after corrected picks are selected. Here, initial picks 300 are illustrated using black X marks, while the corrected picks are illustrated using colored, shaded circles. As described above, the resulting probability density functions can comprise one or more peaks with a higher likelihood of being an accurate corrected pick. One or more of these peaks can be selected from each probability density function as a corrected pick. The resulting list can comprise a set of corrected picks. This list can be overlaid on the DAS data as illustrated in FIG. 3C. The visual indications for initial picks 300 and corrected picks 304 can comprise different colors, different shapes, or any other visual indication for a user to differentiate the type of picks. In some embodiments, FIG. 3C can be generated automatically after the user determines how many peaks are to be selected from each probability density function. Alternatively, the user may request another iteration of the system as described above to generate new probability density functions. The displays in FIGS. 3B and 3C can automatically update as each iteration is completed. In some embodiments, a linear fit can be overlaid onto the display to illustrate a linear fit for the corrected phase picks. This linear fit can also update as the system iteratively runs cross correlation.

Figure 4:
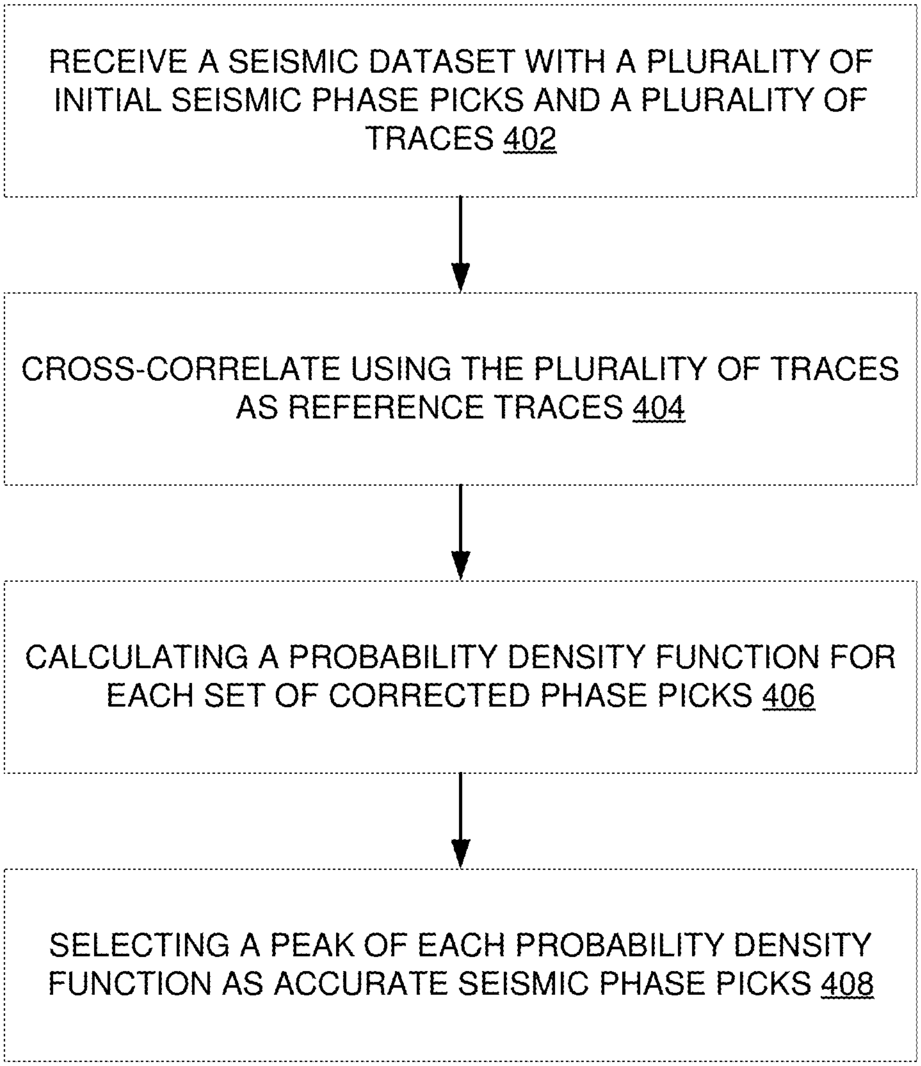
FIG. 4 illustrates an example method incorporating the embodiments described herein.

FIG. 4 illustrates an example method incorporating the systems described above. At block 402, the system can receive a seismic dataset with a plurality of initial seismic phase picks and a plurality of traces. As described above and as illustrated in FIG. 3A, phase picking algorithm can be used to pick the initial seismic phases from the DAS data. These initial seismic phases can be referred to as initial "picks". The phase picking algorithm can be applied for individual P and S picks for the respective seismic stations. In some embodiments, the phase picking algorithm can be applied to all DAS channels independently to generate P and S picks of interest, together with their respective probabilities. Any phase picking algorithm can be applied, as the correction process does not rely solely on the initial picks in generating the accurate, corrected picks. The phase picking algorithms can generate a list of P and/or S picks.

At block 404, the system can cross-correlate each of the plurality of initial seismic phase picks using the plurality of traces as reference traces to generate a set of corrected phase picks for each of the plurality of initial seismic phase picks. As described above, all the traces in the segment are used to perform the cross-correlation. The system will generate a corrected pick for every reference trace to create a set of new corrected picks for each initial pick. This cross correlation can be repeated over all channels to build a series of points.

At block 406, the system can calculate a probability density function for each set of corrected phase peaks. As described above, the resulting probability density function can comprise one or more peaks with a higher likelihood of being an accurate corrected pick. At block 408, the system can select a peak of each probability density functions as accurate seismic phase picks. One or more of these peaks can be selected from each probability density function as a corrected pick. In some embodiments, up to three peaks from each probability density function are selected as corrected picks. The resulting list can comprise a set of corrected picks.

The method of FIG. 4 can be performed iteratively using the corrected picks as the new "initial" picks. As cross correlation is run across all channels, the probability density functions can collapse into a spike indicating a higher likelihood of confidence in the corrected pick. This process can be iteratively run as many times as necessary. In some embodiments, a user of the system interface can select the number of iterations. In other embodiments, the number of iterations may be predefined or default.

Figure 5:
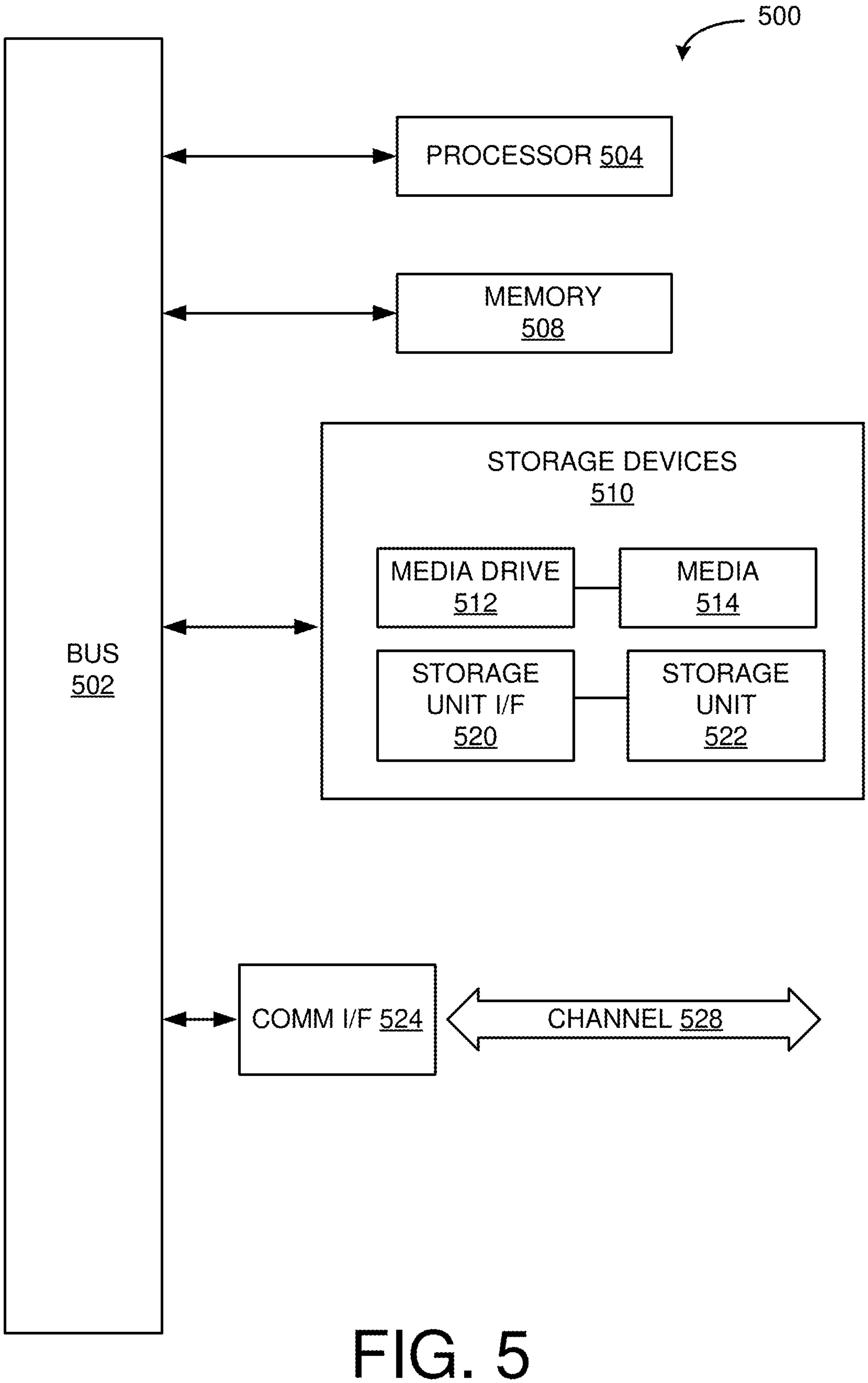
FIG. 5 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAS, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionalities can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method of seismic phase picking, comprising:

receiving a seismic dataset with a plurality of traces for a subsurface region, the plurality of traces comprising a first trace and a second trace;

generating a plurality of initial seismic phase picks for the seismic dataset, the plurality of initial seismic phase picks comprising a first initial seismic phase pick and a second initial seismic phase pick;

determining time lags to align each of the plurality of initial seismic phase picks by cross-correlating each of the plurality of initial seismic phase picks using each of the plurality of traces as reference traces, wherein time lags are generated for the first initial seismic phase pick by using the first trace as a first reference trace and the second trace as a second reference trace and time lags are generated for the second initial seismic phase pick by using the first trace as the first reference trace and the second trace as the second reference trace;

aggregating the time lags determined by using each of the plurality of traces as the reference traces, wherein aggregating the time lags comprise calculating a probability density function for the plurality of initial seismic phase picks, wherein a first probability density function is calculated for the first initial seismic phase pick by using the time lags generated for the first initial seismic phase pick with the first trace as the first reference trace and the second trace as the second reference trace and a second probability density function is calculated for the second initial seismic phase pick by using the time lags generated for the second initial seismic phase pick with the first trace as the first reference trace and the second trace as the second reference trace;

selecting a peak of each of the probability density functions as accurate seismic phase picks; and performing an operation in the subsurface region, wherein the accurate seismic phase picks improve safety of the operation in the subsurface region.

2. The computer-implemented method of claim 1, wherein the seismic dataset comprises distributed acoustic sensing (DAS) data.

3. The computer-implemented method of claim 1, further comprising interpolating the plurality of initial seismic phase picks.

4. The computer-implemented method of claim 1, wherein the plurality of initial seismic phase picks is generated using a machine learning algorithm.

5. The computer-implemented method of claim 1, wherein user input determines how many peaks are selected.

6. The computer-implemented method of claim 1, further comprising applying amplitude gain control (AGC) to the seismic dataset.

7. The computer-implemented method of claim 1, further comprising identifying a seismic event location in the subsurface region based on the accurate seismic phase picks, wherein the operation in the subsurface region is performed based on the seismic event location.

8. The computer-implemented method of claim 1, further comprising generating a polynomial fit based on the accurate seismic phase picks.

9. A computer system, comprising:

a processor; and a memory encoded with instructions, which, when executed by the processor, causes the processor to:

receive a seismic dataset with a plurality of traces for a subsurface region, the plurality of traces comprising a first trace and a second trace;

generate a plurality of initial seismic phase picks for the seismic dataset, the plurality of initial seismic phase picks comprising a first initial seismic phase pick and a second initial seismic phase pick;

determine time lags to align each of the plurality of initial seismic phase picks by cross-correlating each of the plurality of initial seismic phase picks using each of the plurality of traces as reference traces, wherein time lags are generated for the first initial seismic phase pick by using the first trace as a first reference trace and the second trace as a second reference trace and time lags are generated for the second initial seismic phase pick by using the first trace as the first reference trace and the second trace as the second reference trace;

aggregate the time lags determined by using each of the plurality of traces as the reference traces, wherein aggregating the time lags comprise calculating a probability density function for the plurality of initial seismic phase picks, wherein a first probability density function is calculated for the first initial seismic phase pick by using the time lags generated for the first initial seismic phase pick with the first trace as the first reference trace and the second trace as the second reference trace and a second probability density function is calculated for the second initial seismic phase pick by using the time lags generated for the second initial seismic phase pick with the first trace as the first reference trace and the second trace as the second reference trace;

select a peak of each of the probability density functions as accurate seismic phase picks; and perform an operation in the subsurface region, wherein the accurate seismic phase picks improve safety of the operation in the subsurface region.

10. The computer system of claim 9, wherein the seismic dataset comprises distributed acoustic sensing (DAS) data.

11. The computer system of claim 9, wherein the plurality of initial seismic phase picks is generated using a machine learning algorithm.

12. The computer system of claim 9, wherein user input determines how many peaks are selected.

13. The computer system of claim 9, wherein the processor is further configured to apply amplitude gain control (AGC) to the seismic dataset.

14. The computer system of claim 9, wherein the processor is further configured to identify a seismic event location in the subsurface region based on the accurate seismic phase picks, wherein the operation in the subsurface region is performed based on the seismic event location.

15. The computer system of claim 9, wherein the processor is further configured to generate a polynomial fit based on the accurate seismic phase picks.

16. A non-transitory machine-readable storage medium encoded with instructions, which when executed by a processor, cause the processor to:

receive a seismic dataset with a plurality of traces for a subsurface region, the plurality of traces comprising a first trace and a second trace;

generate a plurality of initial seismic phase picks for the seismic dataset, the plurality of initial seismic phase picks comprising a first initial seismic phase pick and a second initial seismic phase pick;

determine time lags to align each of the plurality of initial seismic phase picks by cross-correlating each of the plurality of initial seismic phase picks using each of the plurality of traces as reference traces, wherein time lags are generated for the first initial seismic phase pick by using the first trace as a first reference trace and the second trace as a second reference trace and time lags are generated for the second initial seismic phase pick by using the first trace as the first reference trace and the second trace as the second reference trace;

aggregate the time lags determined by using each of the plurality of traces as the reference traces, wherein aggregating the time lags comprise calculating a probability density function for the plurality of initial seismic phase picks, wherein a first probability density function is calculated for the first initial seismic phase pick by using the time lags generated for the first initial seismic phase pick with the first trace as the first reference trace and the second trace as the second reference trace and a second probability density function is calculated for the second initial seismic phase pick by using the time lags generated for the second initial seismic phase pick with the first trace as the first reference trace and the second trace as the second reference trace;

select a peak of each of the probability density functions as accurate seismic phase picks; and perform an operation in the subsurface region, wherein the accurate seismic phase picks improve safety of the operation in the subsurface region.

17. The non-transitory machine-readable storage medium of claim 16, wherein the processor is further configured to linearly interpolate the plurality of initial seismic phase picks.

18. The non-transitory machine-readable storage medium of claim 16, wherein user input determines how many peaks are selected.

19. The non-transitory machine-readable storage medium of claim 16, wherein the processor is further configured to identify a seismic event location in the subsurface region based on the accurate seismic phase picks, wherein the operation in the subsurface region is performed based on the seismic event location.

20. The non-transitory machine-readable storage medium of claim 16, wherein the processor is further configured to generate a polynomial fit based on the accurate seismic phase picks.

* * * * *